(12) United States Patent
Qi et al.

(10) Patent No.: US 7,519,329 B2
(45) Date of Patent: Apr. 14, 2009

(54) DETERMINATION OF ANTENNA NOISE TEMPERATURE FOR HANDHELD WIRELESS DEVICES

(75) Inventors: Yihong Qi, Waterloo (CA); Perry Jarmuszewski, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 623 days.

(21) Appl. No.: 11/173,093

(22) Filed: Jul. 1, 2005

(65) Prior Publication Data

US 2007/0004338 A1    Jan. 4, 2007

(51) Int. Cl.
*H04B 1/00* (2006.01)

(52) U.S. Cl. ................. 455/63.1; 455/67.11; 455/67.13; 455/222; 455/223; 455/224; 455/296; 375/226; 375/227

(58) Field of Classification Search ................. 455/63.1
See application file for complete search history.

(56) References Cited

U.S. PATENT DOCUMENTS

| | | | | |
|---|---|---|---|---|
| 5,778,026 A * | 7/1998 | Zak | ............................ | 375/219 |
| 5,797,082 A * | 8/1998 | Lusignan | ...................... | 725/70 |
| 5,799,243 A * | 8/1998 | Ojaniemi | ................... | 455/63.1 |
| 5,812,296 A * | 9/1998 | Tarusawa et al. | ............ | 398/116 |
| 5,844,862 A * | 12/1998 | Cocatre-Zilgien | ............ | 368/10 |
| 5,889,821 A * | 3/1999 | Arnstein et al. | ............. | 375/285 |
| 5,913,151 A * | 6/1999 | Lusignan | ................... | 455/3.01 |
| 5,930,680 A * | 7/1999 | Lusignan | ................... | 455/12.1 |
| 5,959,580 A * | 9/1999 | Maloney et al. | ............. | 342/457 |
| 6,011,979 A | 1/2000 | Schwengler | ................ | 455/561 |
| 6,069,588 A * | 5/2000 | O'Neill, Jr. | .................. | 343/713 |
| 6,075,969 A * | 6/2000 | Lusignan | ................... | 455/3.02 |
| 6,115,409 A * | 9/2000 | Upadhyay et al. | ........... | 375/144 |
| 6,272,354 B1 * | 8/2001 | Saario | ......................... | 455/522 |
| 6,434,372 B1 * | 8/2002 | Neagley et al. | ............. | 455/106 |
| 6,628,956 B2 * | 9/2003 | Bark et al. | ................... | 455/522 |
| 6,714,609 B1 * | 3/2004 | Keisala | ........................ | 375/349 |
| 6,785,526 B2 * | 8/2004 | McLain et al. | .............. | 455/296 |
| 6,954,657 B2 * | 10/2005 | Bork et al. | .................. | 455/567 |
| 7,031,702 B2 * | 4/2006 | Karabinis et al. | ........... | 455/427 |
| 7,120,431 B1 * | 10/2006 | Huo et al. | .................... | 455/423 |
| 7,136,621 B2 * | 11/2006 | de La Chapelle et al. | .. | 455/13.2 |
| 7,206,605 B2 * | 4/2007 | Hattori | ........................ | 455/561 |

(Continued)

OTHER PUBLICATIONS

Breslin Donald, "Adaptive Antenna Arrays Applied To Position Location", VPI and State University, Blacksburg, Virginia 1997, 67 pages.*

(Continued)

*Primary Examiner*—Duc Nguyen
*Assistant Examiner*—Hai V Nguyen
(74) *Attorney, Agent, or Firm*—Allen, Dyer, Doppelt, Milbrath & Gilchrist, P.A.

(57) ABSTRACT

Antenna noise temperature is determined for a handheld wireless communication device which typically includes a radio, e.g. having a wireless transceiver and associated circuitry connected thereto, and an antenna connected to the radio. The method includes measuring an antenna thermal noise component, measuring a radio noise component, measuring an environmental background noise component, and determining the antenna noise temperature based upon the measured antenna thermal noise, radio noise, and environmental background noise components. The method may include measuring antenna efficiency, and determining further includes weighting at least one of the measured antenna thermal noise, radio noise and environmental background noise components based upon the measured antenna efficiency.

20 Claims, 4 Drawing Sheets

U.S. PATENT DOCUMENTS

| | | | |
|---|---|---|---|
| 7,209,737 B2* | 4/2007 | Cho | 455/425 |
| 7,209,760 B2* | 4/2007 | Kochanski et al. | 455/501 |
| 7,263,333 B2* | 8/2007 | Roberts | 455/67.13 |
| 7,283,843 B2* | 10/2007 | Tripathi | 455/561 |
| 7,289,806 B2* | 10/2007 | Morris et al. | 455/432.3 |
| 7,327,996 B2* | 2/2008 | Chen et al. | 455/301 |
| 7,346,310 B2* | 3/2008 | Chevalier et al. | 455/1 |
| 2001/0006891 A1* | 7/2001 | Cho | 455/425 |
| 2001/0044588 A1* | 11/2001 | Mault | 600/549 |
| 2002/0010008 A1* | 1/2002 | Bork et al. | 455/567 |
| 2003/0087606 A1* | 5/2003 | Dybdal et al. | 455/67.1 |
| 2004/0005871 A1* | 1/2004 | Saito et al. | 455/287 |
| 2004/0092281 A1* | 5/2004 | Burchfiel | 455/522 |
| 2005/0137814 A1* | 6/2005 | Kelly et al. | 702/69 |
| 2005/0164642 A1* | 7/2005 | Roberts | 455/67.13 |
| 2005/0164664 A1* | 7/2005 | DiFonzo et al. | 455/277.1 |
| 2005/0223030 A1* | 10/2005 | Morris et al. | 707/104.1 |
| 2006/0035588 A1* | 2/2006 | de La Chapelle | 455/13.3 |
| 2006/0046636 A1* | 3/2006 | Chevalier et al. | 455/1 |
| 2006/0111056 A1* | 5/2006 | Dutta | 455/103 |
| 2006/0153307 A1* | 7/2006 | Brown et al. | 375/257 |
| 2006/0178163 A1* | 8/2006 | Richards et al. | 455/522 |
| 2006/0223440 A1* | 10/2006 | Stockton | 455/63.1 |
| 2006/0276714 A1* | 12/2006 | Holt et al. | 600/481 |
| 2006/0291549 A1* | 12/2006 | Seppinen et al. | 375/227 |
| 2007/0032201 A1* | 2/2007 | Behzad et al. | 455/73 |
| 2007/0093210 A1* | 4/2007 | Kochanski et al. | 455/63.1 |
| 2007/0182624 A1* | 8/2007 | Thiesen | 342/174 |
| 2007/0243865 A1* | 10/2007 | Cho | 455/425 |
| 2008/0045792 A1* | 2/2008 | Shimizu et al. | 600/118 |
| 2008/0198910 A1* | 8/2008 | Tidestav | 375/226 |

OTHER PUBLICATIONS

Muratore et al., "Capacity Comparison Between The GSM Mobile Radio System And A CDMA-Based One", IEEE 1995, pp. 396-401.*

Agius et al., "The Design of Specifications For Satellite PCN Handheld Antennas", IEEE 1997, pp. 36-40.*

Phillips K. P., "An Overview of Propagation Factors Infulancing The Design of Mobile Satellite Communication Systems", IEE 1997, Conference Publication No. 436, pp. 1261-1268.*

Aguis et al., "Prediction of Downlink Effective Statistical G/T In Satellite PCN Handsets", IEEE 1998, pp. 86-90.*

Kargel et al., "Infrared Thermal Imaging to Measure Local Temperature Rises Caused by Handheld Mobiel Phones", IEEE 2005, pp. 1513-1519.*

"Quadrifiliar Helical Antennas for Personal Satellite Terminals", Caimi et al., White Paper, Sep. 1, 2004, pp. 1-5, XP002355132, available at www.skycross.com.

* cited by examiner

DETERMINATION OF ANTENNA NOISE TEMPERATURE FOR HANDHELD WIRELESS DEVICES

FIELD OF THE INVENTION

The present invention relates to the field of communications devices, and, more particularly, to mobile wireless communications devices and related methods.

BACKGROUND OF THE INVENTION

Cellular communications systems continue to grow in popularity and have become an integral part of both personal and business communications. Cellular phones allow users to place and receive voice calls most anywhere they travel. Cellular phones and other handheld wireless communication devices typically include a radio, e.g. having a wireless transceiver and associated circuitry connected thereto, and an antenna connected to the radio.

Antenna noise temperature has been discussed in many books and papers, such as John D. Kraus and Ronald J. Marhefka, "Antennas: For all Applications", McGraw Hill, 2002, ch. 12; Constantine A. Balanis, "Antenna Theory: Analysis and Design" John Wiley & Sons Inc. 1997, ch. 2; David M. Pozar, "Microwave Engineering", Addison-Wesley Publishing Company, 1993, ch. 12; J. Dijk, M.Jeuken and E. J. Maanders, "Antenna noise temperature", Proc. IEEE, Vol. 115, No. 10, October 1968, pp 1403-1409; and Warren L. Flock and Ernest K. Smith, "Natural Radio Noise-a Mini-Review", IEEE Trans. on AP Vol. Ap-32, No.7, July 1984 pp 762-767.

The definitions for antenna noise temperature are mainly given based on remote sensing and satellite receiving applications, where antennas are generally physically away or well shielded from radio receivers and high gain antennas are used to capture weak signals. In this case the total noise at the terminal of the receiver antenna is mainly contributed from thermal noise and background noise. In contrast, a wireless handheld antenna is physically very close to its receiver so that the printed circuit board and accessories operate as a part of the antenna. This makes the noise contributions to the handheld wireless device antenna different from the noise contributions to antennas for remote sensing and satellite receiving applications.

This difference makes the standard antenna temperature definition inadequate for explaining the receiver behavior of handheld wireless devices in a noisy environment. A wireless handheld device generally operates in an ever changing noise environment, and the handheld antenna radiation pattern is generally a broad beam antenna pattern. Furthermore, human physical interface and device usage scenarios change constantly in the practical application. For these reasons, antenna noise temperature is constantly changing in the practical sense.

DETAILED DESCRIPTION OF THE PREFERRED EMBODIMENTS

Figure 1:
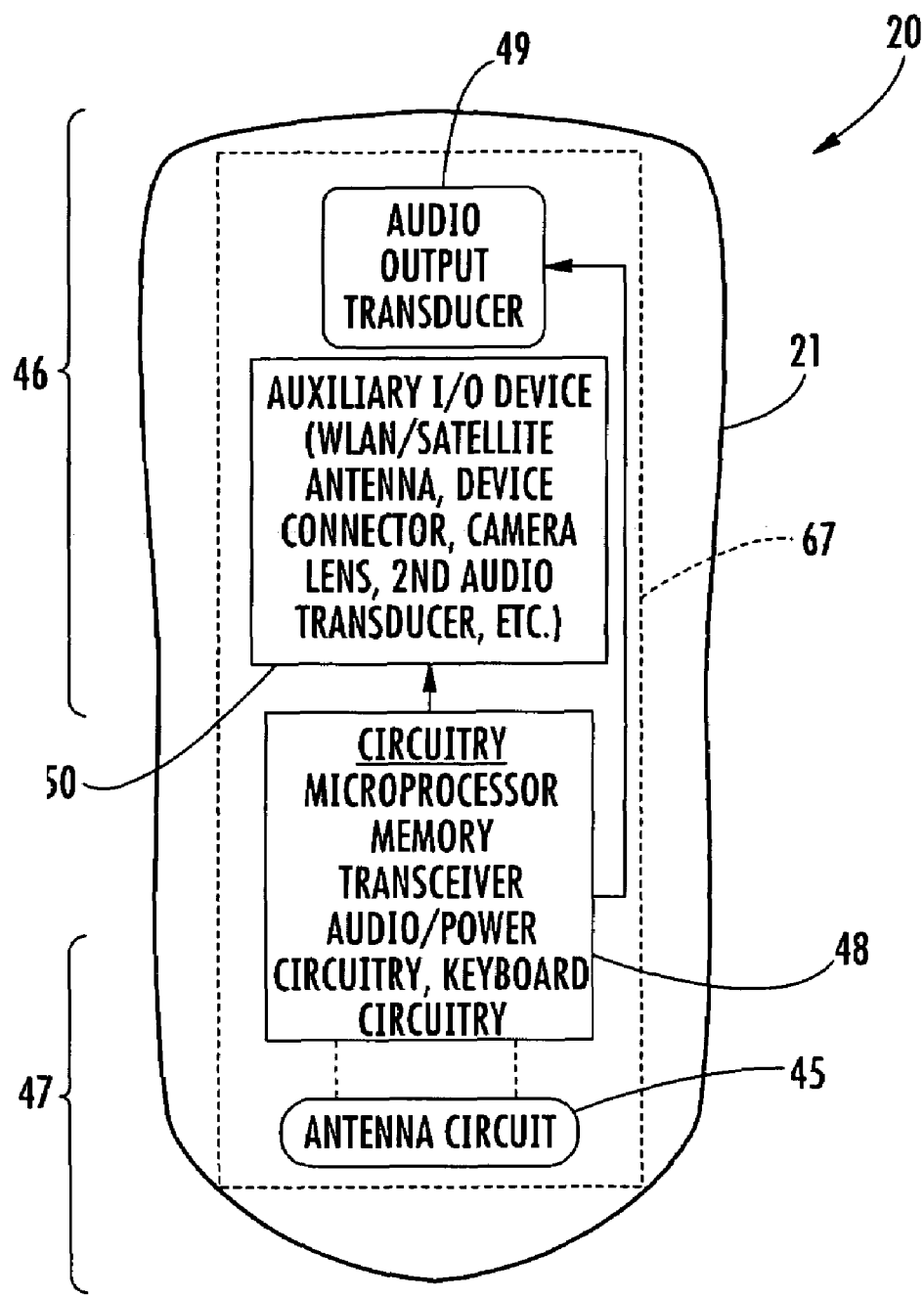
FIG. 1 is a schematic diagram of a handheld wireless communication device for use with the method of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In view of the foregoing background, it is therefore an object of the present invention to provide a method of accurately determining the antenna noise temperature for a handheld wireless communication device.

A determination or definition of antenna noise temperature is presented herein. Radio noise temperature is introduced to explain the radio receiver behavior under a complex noise environment for handheld wireless devices. The noise sources and their coupling mechanisms are also discussed. A method of determining receive sensitivity including determining an antenna radiation pattern and independently determining a thermal noise temperature is also provided.

These and other objects, features, and advantages in accordance with the present invention are provided by a method of determining an antenna noise temperature for a handheld wireless communication device including a radio, e.g. having a wireless transceiver and associated circuitry connected thereto, and an antenna connected to the radio. The method includes measuring an antenna thermal noise component; measuring a radio noise component; measuring an environmental background noise component; and determining the antenna noise temperature based upon the measured antenna thermal noise, radio noise, and environmental background noise components.

The method may include measuring antenna efficiency, and determining may further include weighting at least one of the measured antenna thermal noise, radio noise and environmental background noise components based upon the measured antenna efficiency.

The antenna noise temperature $T_t$ may be defined as $$T_t = \eta T_A + (1-2\eta)T_P + \eta T_R$$

where $\eta$ is measured antenna efficiency, $T_A$ is the environmental background noise component, $T_P$ is the antenna thermal noise component, and $T_R$ is the radio noise component.

The antenna thermal noise component may be based upon a measured conductive sensitivity which is based upon a minimum detectable signal-to-noise ratio and a minimum input signal level when the antenna is replaced by a signal generator. The antenna thermal noise component $T_P$ may be defined as $$T_P = \frac{P_{sig \cdot min}}{F \cdot SNR_{out \cdot min} \cdot k \cdot B}$$

where $SNR_{out \cdot min}$ is the minimum detectable signal-to-noise ratio, $P_{sig \cdot min}$ is the minimum input signal level, k is Boltzman's constant, B is the channel bandwidth and F is a device noise figure which is defined as a ratio of the input signal-to-noise ratio and the output signal-to-noise ratio ($SNR_{in}/SNR_{out}$)

The radio noise component may be based upon a measured radiated sensitivity of the communication device in an anechoic chamber at room temperature. The radio noise component $T_R$ may be defined as $$T_R = \frac{P_{sig \cdot min}}{F \cdot SNR_{out \cdot min} \cdot k \cdot B \cdot \eta} - \frac{(1-\eta)T_P}{\eta}$$

where $SNR_{out.min}$ is the minimum detectable signal-to-noise ratio, $P_{sig.min}$ is the minimum input signal level, k is Boltzman's constant, B is the channel bandwidth, F is a device noise figure which is defined as a ratio of the input signal-to-noise ratio and the output signal-to-noise ratio ($SNR_{in}/SNR_{out}$), η is measured antenna efficiency, and $T_P$ is the antenna thermal noise component.

The environmental background noise component may be based upon measured radiated sensitivity of the communication device in an operating environment including a plurality of noise sources. The environmental background noise component $T_A$ may be defined as $$T_A = \frac{P_{sig \cdot min}}{F \cdot SNR_{out \cdot min} \cdot k \cdot B \cdot \eta} - \frac{(1-2\eta)T_P}{\eta} - T_R$$

where $SNR_{out.min}$ is the minimum detectable signal-to-noise ratio, $P_{sig.min}$ is the minimum input signal level, k is Boltzman's constant, B is the channel bandwidth, F is a device noise figure which is defined as a ratio of the input signal-to-noise ratio and the output signal-to-noise ratio ($SNR_{in}/SNR_{out}$), η is measured antenna efficiency, $T_P$ is the antenna thermal noise component, and $T_R$ is the radio noise component.

Objects, features, and advantages in accordance with the present invention are also provided by a method for determining receive sensitivity for a wireless handheld device including an antenna and a radio connected thereto. Again, the radio preferably includes a wireless transceiver and associated circuitry connected thereto. The method may include determining an antenna radiation pattern; and independently determining a thermal noise temperature by measuring an antenna thermal noise component, measuring a radio noise component, measuring an environmental background noise component, and determining the antenna noise temperature based upon the measured antenna thermal noise, radio noise, and environmental background noise components. The receive sensitivity may be determined based upon antenna radiation pattern and the thermal noise temperature.

Referring now to FIG. 1, an example of a mobile wireless communications device 20, such as a handheld portable cellular radio, which can be used with the present invention is first described. This device 20 illustratively includes a housing 21 having an upper portion 46 and a lower portion 47, and a dielectric substrate (i.e., circuit board) 67, such as a conventional printed circuit board (PCB) substrate, for example, carried by the housing. A housing cover (not shown in detail) would typically cover the front portion of the housing. The illustrated housing 21 is a static housing, for example, as opposed to a flip or sliding housing which are used in many cellular telephones. However, these and other housing configurations may also be used.

Circuitry 48 is carried by the circuit board 67, such as a microprocessor, memory, one or more wireless transceivers (e.g., cellular, WLAN, etc.), which includes RF circuitry, including audio and power circuitry, including any keyboard circuitry. It should be understood that keyboard circuitry could be on a separate keyboard, etc., as will be appreciated by those skilled in the art. A rechargeable battery (not shown) is also preferably carried by the housing 21 for supplying power to the circuitry 48. The term RF circuitry could encompass the cooperating RF transceiver circuitry, power circuitry and audio circuitry.

Furthermore, an audio output transducer 49 (e.g., a speaker) is carried by an upper portion 46 of the housing 21 and connected to the circuitry 48. One or more user input interface devices, such as a keypad, is also preferably carried by the housing 21 and connected to the circuitry 48. The term keypad as used herein also refers to the term keyboard, indicating the user input devices having lettered and/or numbered keys commonly known and other embodiments, including multi-top or predictive entry modes. Other examples of user input interface devices include a scroll wheel, a back button, a stylus or touch screen interface. The device 20 would typically include a display (not shown), for example, a liquid crystal display (LCD) carried by the housing 21 and connected to the circuitry 48.

An antenna 45 is illustratively positioned at the lower portion 47 in the housing and can be formed as a pattern of conductive traces that make an antenna circuit, which physically forms the antenna. It is connected to the circuitry 48 on the main circuit board 67. In one non-limiting example, the antenna could be formed on an antenna circuit board section that extends from the circuit board at the lower portion of the housing. By placing the antenna 45 adjacent the lower portion 47 of the housing 21, the distance is advantageously increased between the antenna and the user's head when the phone is in use to aid in complying with applicable SAR requirements. Also, a separate keyboard circuit board could be used.

More particularly, a user will typically hold the upper portion 46 of the housing 21 very close to his head so that the audio output transducer 49 is directly next to his ear. Yet, the lower portion 47 of the housing 21 where an audio input transducer (i.e., microphone) is located need not be placed directly next to a user's mouth, and can be held away from the user's mouth. That is, holding the audio input transducer close to the user's mouth may not only be uncomfortable for the user, but it may also distort the user's voice in some circumstances.

Another important benefit of placing the antenna 45 adjacent the lower portion 47 of the housing 21 is that this may allow for less impact on antenna performance due to blockage by a user's hand. That is, users typically hold cellular phones toward the middle to upper portion of the phone housing, and are therefore more likely to put their hands over such an antenna than they are an antenna mounted adjacent the lower portion 47 of the housing 21. Accordingly, more reliable performance may be achieved from placing the antenna 45 adjacent the lower portion 47 of the housing 21.

Still another benefit of this configuration is that it provides more room for one or more auxiliary input/output (I/O) devices 50 to be carried at the upper portion 46 of the housing. Furthermore, by separating the antenna 45 from the auxiliary I/O device(s) 50, this may allow for reduced interference therebetween.

Some examples of auxiliary I/O devices 50 include a WLAN (e.g., Bluetooth, IEEE 802.11) antenna for providing WLAN communication capabilities, and/or a satellite positioning system (e.g., GPS, Galileo, etc.) antenna for providing position location capabilities, as will be appreciated by those skilled in the art. Other examples of auxiliary I/O devices 50 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 50 means that such devices may have input and/or output capabilities, and they need not provide both in all embodiments. That is, devices such as camera lenses may only receive an optical input, for example, while a headphone jack may only provide an audio output.

Accordingly, the mobile wireless communications device 20 as described may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

The antenna 45 may be formed as a multi-frequency band antenna, which provides enhanced transmission and reception characteristics over multiple operating frequencies. More particularly, the antenna 45 may provide high gain, desired impedance matching, and meet applicable SAR requirements over a relatively wide bandwidth and multiple cellular frequency bands. By way of example, the antenna 45 may operate over five bands, namely a 850 MHz Global System for Mobile Communications (GSM) band, a 900 MHz GSM band, a DCS band, a PCS band, and a WCDMA band (i.e., up to about 2100 MHz), although it may be used for other bands/frequencies as well. To conserve space, the antenna 45 may advantageously be implemented in three dimensions although it may be implemented in two-dimensional or planar embodiments as well.

Figure 2:
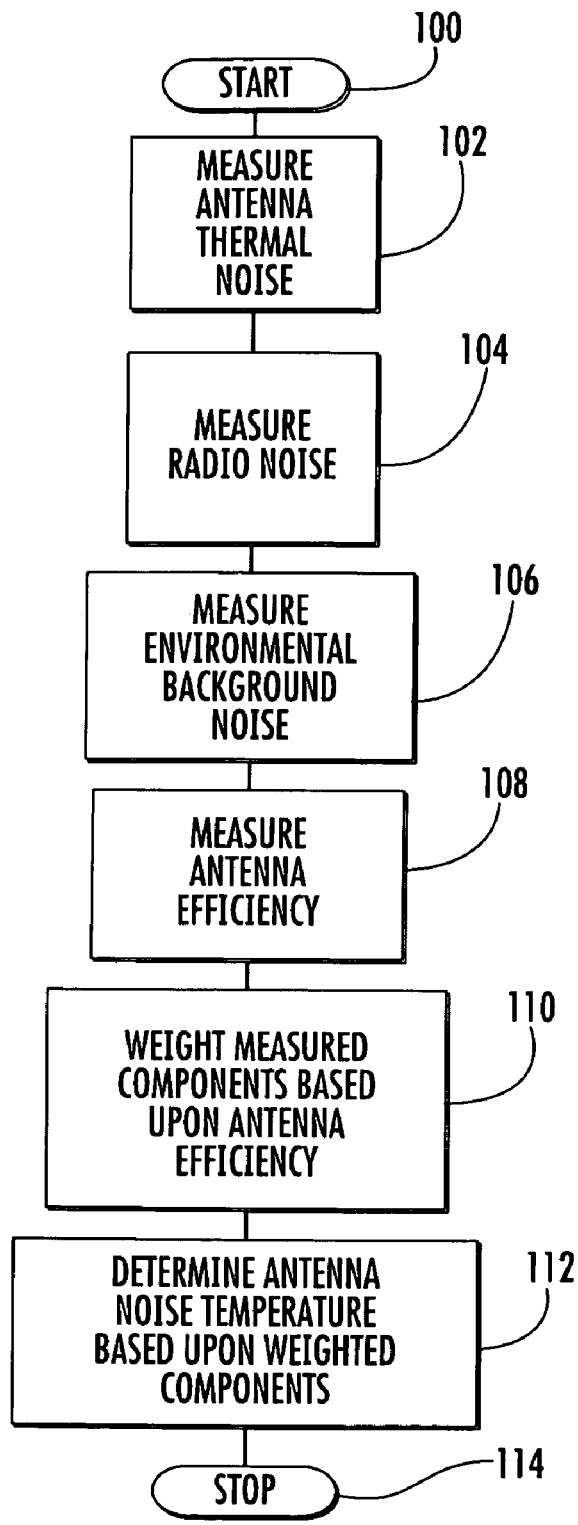
FIG. 2 is a flowchart illustrating steps of the method in accordance with an embodiment of the present invention.
Figure 3:
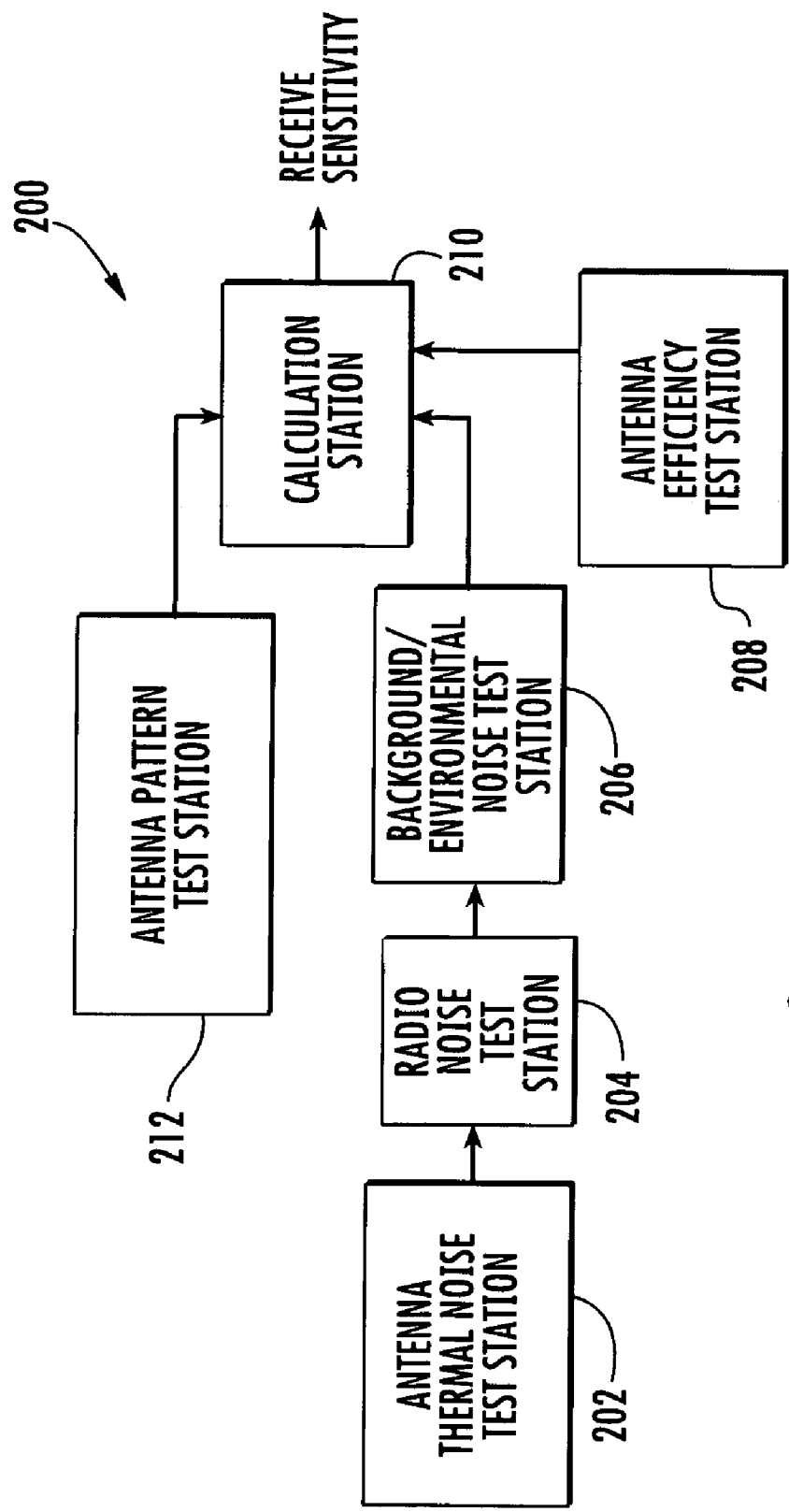
FIG. 3 is a schematic block diagram illustrating the various work stations to implement the method of FIG. 2.

Referring now to FIGS. 2 and 3, a method and processing system for determining an antenna noise temperature for a handheld wireless communication device 20 will be described. As discussed above, the handheld device 20 includes a radio, e.g. having a wireless transceiver and associated circuitry 48 connected thereto, and an antenna 45 connected to the radio. The method begins at block 100 (FIG. 2) and includes measuring an antenna thermal noise component (Block 102), measuring a radio noise component (Block 104), measuring an environmental background noise component (Block 106), and, at Block 112, determining the antenna noise temperature based upon the measured antenna thermal noise, radio noise, and environmental background noise components. Preferably, the method includes measuring antenna efficiency (Block 108), and weighting at least one of the measured antenna thermal noise, radio noise and environmental background noise components based upon the measured antenna efficiency (Block 110).

As will be described in greater detail below, the antenna thermal noise component may be based upon a measured conductive sensitivity which is a ratio of the minimum detectable signal-to-noise ratio and a minimum input signal level when the antenna is replaced by a signal generator. The radio noise component may be based upon a measured radiated sensitivity of the communication device 20 in an anechoic chamber at room temperature, and the environmental background noise component may be based upon measured radiated sensitivity of the communication device 20 in an operating environment including a plurality of noise sources.

More specifically, for antenna noise temperature determination, one of the quantities by which one can define the overall performance of a radio receiver system is the signal-to-noise ratio. For a radio receiver system, the system noise figure F is defined as input signal-to-noise ratio over output signal-to-noise ratio. It follows that $$F = SNR_{in}/SNR_{out} \quad (1)$$

where $$SNR_{in} = \frac{P_{sig}}{P_n} \quad (2)$$

$P_{sig}$=the input signal power per unit bandwidth,
$P_n$=the input noise power per unit bandwidth,
$SNR_{in}$=the input signal to noise ratio, and
$SNR_{out}$=the output signal to noise ratio.

Since the overall signal power and noise power are distributed across the channel bandwidth, B, the total mean square power $P_{sigt}$ and $P_{nt}$ can be obtained by integrating over the bandwidth. Thus for the total power in a channel, we have $$P_{sigt} = P_{nt} \cdot F \cdot SNR_{out} \quad (3)$$

This equation also predicts the radio sensitivity as output signal to noise ratio reaches its threshold.

Noise energy as a function of frequency for an ideal black body is given by Planck's radiation law and the Rayleigh-Jeans approximation, which holds reasonably well at microwave frequencies. Assuming conjugate match at the receiver input and for a noise flat channel, we have $$P_{nt} = kT_t B \quad (4)$$

where $T_t$=the total temperature in degrees Kelvin (K) and $k=1.380 \times 10^{-23}$ J/° K (Boltzman's constant)

For the handheld wireless receiver, $P_{nt}$ is the total antenna noise power at the antenna terminal. $T_t$ is the antenna temperature. There are various noise sources for the handheld radio receiver, and it may be desirable that the individual noise be separable. Due to the antenna aperture size and application requirement, the handheld antenna generally has a broad beam radiation pattern. It is more efficient and convenient to classify the handheld noise types based on the measurable quantities. Accordingly, the handheld antenna noise temperature is classified into three types.

The first type of noise is the antenna thermal noise. Antenna thermal noise is caused by the random thermally excited vibration of the charge carriers in the antenna conductor. This carrier motion is similar to the Brownian motion of particles. In every conductor or resistor at a temperature above absolute zero, the electrons are in random motion, and its vibration is dependent on temperature. The available noise power can be in the same equation form as (4) and it is $$P_P = kT_P B \quad (5)$$

where $T_P$=the thermal or physical temperature.

The antenna thermal noise is practically achievable in a system operating at room temperature. It may not be possible to achieve any lower noise unless the temperature of the receiver antenna is lowered. So it is also referred to as the "noise floor". The thermal noise determines the minimum sensitivity of a radio receiver. Thermal noise is not antenna efficiency dependent.

The second type of the noise is man-made environmental noises and background noises. The man-made environment noise refers to the intentional or unintentional man-made noise other than the radio noise of its own. The man-made environmental noises include electrical and electronics noise, such as fluorescent lights, ignitions, radio transmitters, computers etc. The man-made environmental noise is generally greater than a wavelength away from the radio receiver of the handheld device. The background noise here refers to the natural noise including natural noise at the earth's surface, atmospheric noises and extraterrestrial noises. Man-made environmental and background noises couple to the antenna through electromagnetic radiation. Due to the broad beam pattern of the antenna, it is difficult to separate the noise sources. This type of noise is antenna radiation pattern and antenna efficiency dependent.

The third type of noise is radio noise of its own, which includes radio processor noise, liquid crystal display (LCD) noise and keyboard noise, etc. A handheld wireless device antenna is generally very close to the radio (much less than a wavelength). The radio noise can couple to the receiver antenna through near-field electrical and near-field magnetic fields. A handheld device antenna may use radio PCB or accessories as part of the antenna. Thus, noise can couple to the radio through a conducted path. The conducted path is due to the antenna having shared impedance with the radio receiver. The near-field electrical and near-field magnetic coupling is due to the loop or dipole kind of noise emission from radio getting picked up by the nearby handheld antenna. The coupling efficiency of this type of noise is also antenna efficiency and antenna type related. The better the antenna efficiency the more of third type of noise gets coupled to the receiver.

Thus, from the above described noise contribution, the total equivalent antenna noise temperature is determined to be the weighted average of the three types of noise temperature, $$T_t = \eta T_A + (1-2\eta)T_P + \eta T_R \quad (6)$$

where $\eta$=antenna efficiency, $T_R$=the radio noise temperature, and $T_A$=the environmental background noise temperature.

The environmental background temperature received at all angles can be expressed as follows $$T_A = \frac{\int_0^{2\pi}\int_0^{\pi} T_B(\theta,\phi)G(\theta,\phi)\sin\theta d\theta d\phi}{\int_0^{2\pi}\int_0^{\pi} G(\theta,\phi)\sin\theta d\theta d\phi} \quad (7)$$

where $T_B(\theta,\phi)$=the distribution of the environmental temperature over all angles about the antenna, and $G(\theta,\phi)$=the power gain pattern of the antenna.

It is desirable that the three types of temperature be measurable. The measurement of the temperature is not only important in understanding the radio noise characteristics, but also a very effective tool for radio design and trouble shooting. The measurement and calculation procedure is described below with each type of the noise temperature being separately identified.

A thermal temperature measurement is measured by disconnecting the antenna, and connecting a signal generator at the antenna terminal. To the radio receiver it is like it has a matching resistor connected thereto. In this case, antenna efficiency is zero, from the equation (6) it can be seen that the noise temperature that the receiver is detecting is thermal temperature $T_P$. For the handheld radio this process is called conductive measurement and the thermal temperature is equal to $$T_P = \frac{P_{sig \cdot min}}{F \cdot SNR_{out \cdot min} \cdot k \cdot B} \quad (8)$$

where $SNR_{out \cdot min}$=the minimum detectable signal-to-noise ratio, and $P_{sig \cdot min}$=the minimum input signal level, i.e. radio sensitivity.

For antenna efficiency measurement, a handheld device antenna is generally small in size, and in a controlled environment the receive antenna efficiency $\eta$ can be measured. The receive antenna efficiency may be measured in any one of the known methods, as would be appreciated by those skilled in the art.

The radio temperature measurement is performed by placing the radio in an anechoic chamber at room temperature $T_P$, so from equation (7) we have $$T_A = T_P \quad (9)$$

Then a radiated sensitivity for the receiver can be determined. In other words, the radio's sensitivity is measured with the antenna connected. Then the radio temperature can be calculated from the measured radiated sensitivity $$T_R = \frac{P_{sig \cdot min}}{F \cdot SNR_{out \cdot min} \cdot k \cdot B \cdot \eta} - \frac{(1-\eta)T_P}{\eta} \quad (10)$$

The environmental and background temperature measurement proceeds after thermal and radio temperature have been measured. The man-made environmental and background temperature can be measured by placing the radio in a working environment, then measuring the radio's radiated sensitivity, such that $$T_A = \frac{P_{sig \cdot min}}{F \cdot SNR_{out \cdot min} \cdot k \cdot B \cdot \eta} - \frac{(1-2\eta)T_P}{\eta} - T_R \quad (11)$$

In the measurement process, the order of the thermal temperature measurement and antenna efficiency measurement is interchangeable, but they both should be measured before the radio temperature measurement.

It is noted that in a handheld radio receiver system the noise from the ground and the surroundings of the antenna including ignition noise, electrical and electronics noise are the dominant noise source of environmental temperature. The distribution function is a function of the specific environment and time. Since a handheld wireless antenna may have a broad beam antenna and, in use, the handheld orientation is also constantly changing, the power gain pattern is also changing with respect to noise source distribution. In this condition, the environmental temperature is changing all the time. An average antenna temperature measurement is a more appropriate approach.

Another factor that affects the antenna temperature in a real world application is that the antenna efficiency changes with human physical interface. For example, when the wireless handheld is in the talking position, it will have a few dB antenna average gain degradation compared to the stand alone position in free space. In this case the antenna temperature is generally lower than the stand alone position in free space.

So, the definition of antenna temperature determination for handheld wireless devices is general. For the remote sensing and satellite application, the radio noise temperature is negligible, then equation (6) may become $$T_t = \eta T_A + (1-\eta) T_P + \eta T_R \qquad (12)$$

which is the same as the equation (3).

The results of the antenna temperature determination illustrate that different radio noise sources have different coupling mechanisms. The radio noise of its own is proportional to the antenna efficiency, but has no direct relationship with the antenna radiation pattern. Accordingly, with the antenna temperature determination of the present invention, handheld sensitivity and antenna pattern can be measured separately. The antenna temperature measurement according to the present invention can be used in the design and trouble shooting of handheld radios. It can also be an important factor for other radio parameter measurements such as total isotropic sensitivity (TIS) measurement.

Referring to FIG. 3, a system 200 for implementing the above method, will now be described. The system 200 may include an antenna thermal noise test station 202, for example, to implement the step of disconnecting the antenna and connecting a signal generator at the antenna terminal, to determine the antenna thermal temperature as described above. A radio noise test station 204, such as an anechoic chamber, is included to determine the radio noise component, and a background/environmental noise test station 206, such as an operating environment or simulated operating environment, is included to determine the background/environmental noise, as described above. As illustrated in the example, a calculation station 210 may determine the antenna noise temperature based upon the measured components and in view of the antenna efficiency which may be measured at the antenna efficiency test station 208. Furthermore, the receive sensitivity of the handheld device 20 may be determined based upon independent determination of the antenna radiation pattern, e.g. at the antenna pattern test station 212, and the antenna noise temperature in accordance with the above described method.

An example of a handheld mobile wireless communications device 1000 that may be used in accordance the present invention is further described with reference to FIG. 4. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 4:
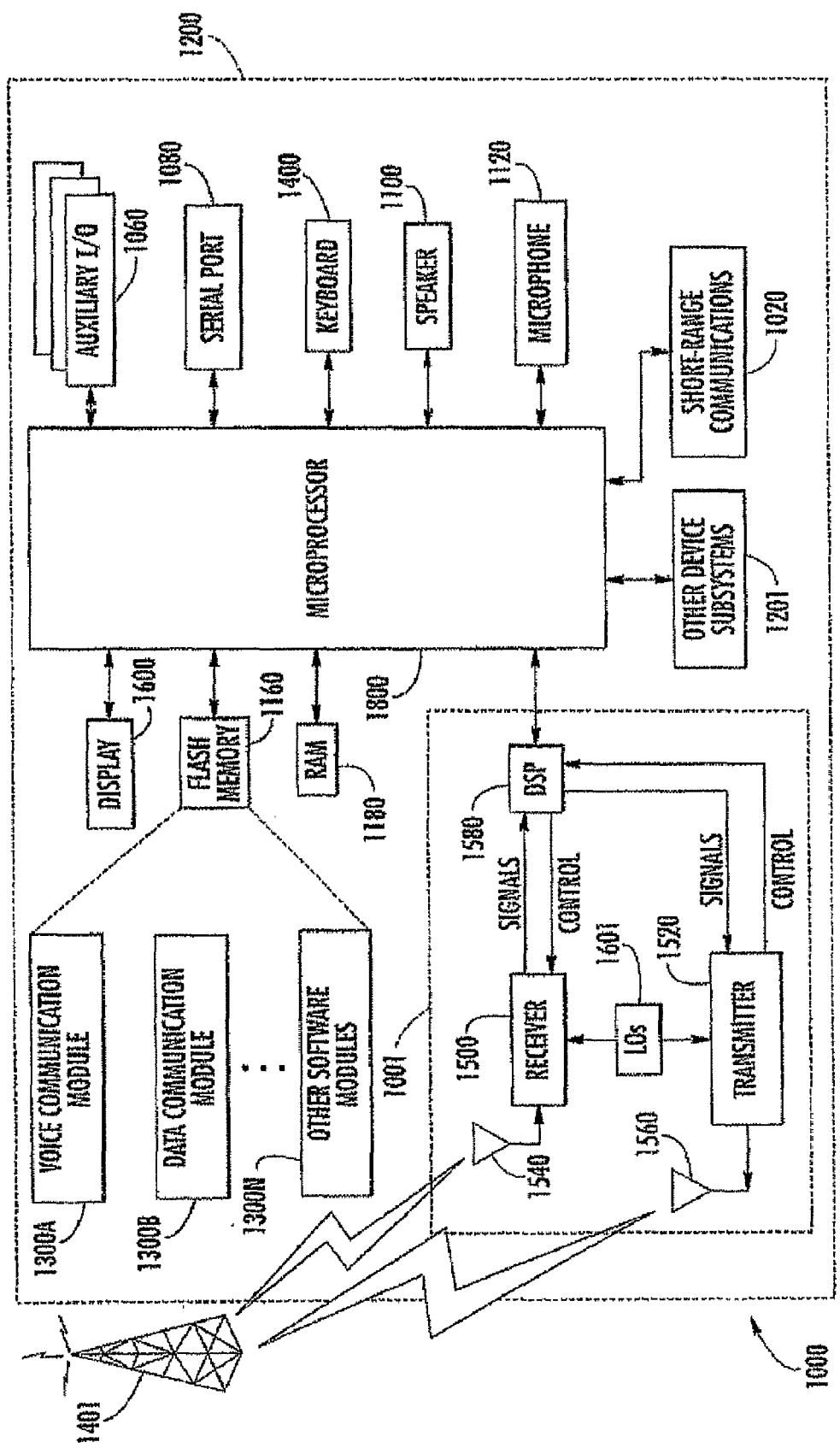
FIG. 4 is a schematic block diagram showing basic functional circuit components that can be used in the mobile wireless communications device of FIG. 1.

In addition to the processing device 1800, other parts of the mobile device 1000 are shown schematically in FIG. 4. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. The antenna system can be designed so that when one antenna is covered by a hand, performance of one or more other antennas, including antenna gain and match, may not be degraded. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A method of determining an antenna noise temperature for a handheld wireless communication device comprising a radio and an antenna connected thereto, the method comprising:
   measuring an antenna thermal noise component;
   measuring a radio noise component generated by the radio of the wireless handheld communication device;
   measuring an environmental background noise component; and
   determining the antenna noise temperature based upon the measured antenna thermal noise, radio noise, and environmental background noise components.

2. The method according to claim 1 wherein the radio comprises a wireless transceiver and associated circuitry connected thereto.

3. The method according to claim 1 further comprising measuring antenna efficiency; and wherein determining further comprises weighting at least one of the measured antenna thermal noise, radio noise and environmental background noise components based upon the measured antenna efficiency.

4. The method according to claim 3 wherein the antenna noise temperature $T_t$ is defined as $$T_t = \eta T_A + (1-2\eta)T_P + \eta T_R$$

where $\eta$ is measured antenna efficiency, $T_A$ is the environmental background noise component, $T_P$ is the antenna thermal noise component, and $T_R$ is the radio noise component.

5. The method according to claim 1 wherein the antenna thermal noise component is based upon a measured conductive sensitivity.

6. The method according to claim 5 wherein the antenna thermal noise component $T_P$ is defined as $$T_P = \frac{P_{sig \cdot min}}{F \cdot SNR_{out \cdot min} \cdot k \cdot B}$$

where $SNR_{out.min}$ is the minimum detectable signal to noise ratio, $P_{sig.min}$ is the minimum input signal level, k is Boltzman's constant, B is channel bandwidth and F is a device noise figure which is defined as a ratio of the input signal-to-noise ratio and the output signal-to-noise ratio ($SNR_{in}/SNR_{out}$).

7. The method according to claim 1 wherein the radio noise component is based upon a measured radiated sensitivity of the communication device in an anechoic chamber at room temperature.

8. The method according to claim 7 wherein the radio noise component $T_R$ is defined as $$T_R = \frac{P_{sig \cdot min}}{F \cdot SNR_{out \cdot min} \cdot k \cdot B \cdot \eta} - \frac{(1-\eta)T_P}{\eta}$$

where $SNR_{out.min}$ is the minimum detectable signal to noise ratio, $P_{sig.min}$ is the minimum input signal level, k is Boltzman's constant, B is channel bandwidth, F is a device noise figure which is defined as a ratio of the input signal-to-noise ratio and the output signal-to-noise ratio ($SNR_{in}/SNR_{out}$), $\eta$ is measured antenna efficiency, and $T_P$ is the antenna thermal noise component.

9. The method according to claim 1 wherein the environmental background noise component is based upon measured radiated sensitivity of the communication device in an operating environment including a plurality of noise sources.

10. The method according to claim 9 wherein the environmental background noise component $T_A$ is defined as $$T_A = \frac{P_{sig \cdot min}}{F \cdot SNR_{out \cdot min} \cdot k \cdot B \cdot \eta} - \frac{(1-2\eta)T_P}{\eta} - T_R$$

where $SNR_{out.min}$ is the minimum detectable signal to noise ratio, $P_{sig.min}$ is the minimum input signal level, k is Boltzman's constant, B is channel bandwidth, F is a device noise figure which is defined as a ratio of the input signal-to-noise ratio and the output signal-to-noise ratio ($SNR_{in}/SNR_{out}$), η is measured antenna efficiency, $T_P$ is the antenna thermal noise component, and $T_R$ is the radio noise component.

11. A method of determining an antenna noise temperature for a handheld wireless communication device comprising a radio, including a wireless transceiver and associated circuitry connected thereto, and an antenna connected to the radio, the method comprising:
    measuring an antenna thermal noise component;
    measuring a radio noise component generated by at least one of the wireless transceiver and the associated circuitry of the radio of the wireless handheld communication device;
    measuring an environmental background noise component;
    measuring antenna efficiency;
    weighting the measured antenna thermal noise, radio noise and environmental background noise components based upon the measured antenna efficiency; and
    determining the antenna noise temperature based upon the weighted antenna thermal noise, radio noise and environmental background noise components.

12. The method according to claim 11 wherein the antenna noise temperature $T_t$ is defined as $$T_t = \eta T_A + (1-2\eta)T_P + \eta T_R$$

where η is measured antenna efficiency, $T_A$ is the environmental background noise component, $T_P$ is the antenna thermal noise component, and $T_R$ is the radio noise component.

13. The method according to claim 11 wherein the antenna thermal noise component is based upon a measured conductive sensitivity.

14. The method according to claim 11 wherein the radio noise component is based upon a measured radiated sensitivity of the communication device in an anechoic chamber at room temperature.

15. The method according to claim 11 wherein the environmental background noise component is based upon measured radiated sensitivity of the communication device in an operating environment including a plurality of noise sources.

16. A method for determining receive sensitivity for a wireless handheld device comprising an antenna and a radio connected thereto, the radio comprising a wireless transceiver and associated circuitry connected thereto, the method comprising:
    determining an antenna radiation pattern; and
    independently determining a thermal noise temperature by
        measuring an antenna thermal noise component,
        measuring a radio noise component generated by at least one of the wireless transceiver and the associated circuitry of the radio of the wireless handheld communication device,
        measuring an environmental background noise component, and
        determining the antenna noise temperature based upon the measured antenna thermal noise, radio noise, and environmental background noise components; and
        determining the receive sensitivity based upon antenna radiation pattern and the thermal noise temperature.

17. The method according to claim 16 wherein the antenna noise temperature $T_t$ is defined as $$T_t = \eta T_A + (1-2\eta)T_P + \eta T_R$$

where η is measured antenna efficiency, $T_A$ is the environmental background noise component, $T_P$ is the antenna thermal noise component, and $T_R$ is the radio noise component.

18. The method according to claim 16 wherein the antenna thermal noise component is based upon a measured conductive sensitivity.

19. The method according to claim 16 wherein the radio noise component is based upon a measured radiated sensitivity of the communication device in an anechoic chamber at room temperature.

20. The method according to claim 16 wherein the environmental background noise component is based upon measured radiated sensitivity of the communication device in an operating environment including a plurality of noise sources.

* * * * *